US006999950B1

(12) United States Patent
Linneberg et al.

(10) Patent No.: US 6,999,950 B1
(45) Date of Patent: Feb. 14, 2006

(54) N-TUPLE OR RAM BASED NEURAL NETWORK CLASSIFICATION SYSTEM AND METHOD

(75) Inventors: Christian Linneberg, København (DK); Thomas Martini Jørgensen, Jyllinge (DK)

(73) Assignee: Intellix A/S, Frederiksberg (DK)

( * ) Notice: Subject to any disclaimer, the term of this patent is extended or adjusted under 35 U.S.C. 154(b) by 0 days.

(21) Appl. No.: 09/720,587

(22) PCT Filed: Jun. 21, 1999

(86) PCT No.: PCT/DK99/00340

§ 371 (c)(1),
(2), (4) Date: Mar. 15, 2001

(87) PCT Pub. No.: WO99/67694

PCT Pub. Date: Dec. 29, 1999

(30) Foreign Application Priority Data

Jun. 23, 1998 (DK) ............................... 1998 00883

(51) Int. Cl.
*G06F 15/18* (2006.01)
(52) U.S. Cl. ............................... 706/12; 706/15; 706/20
(58) Field of Classification Search .................. 706/12, 706/13, 20, 15, 23, 25
See application file for complete search history.

(56) References Cited

U.S. PATENT DOCUMENTS

| 4,975,975 | A |   | 12/1990 | Filipski ........................ 141/157 |
| 5,359,699 | A |   | 10/1994 | Tong et al. .................... 706/20 |
| 5,555,344 | A |   | 9/1996 | Zünkler ........................ 704/242 |
| 5,790,754 | A | * | 8/1998 | Mozer et al. ................ 704/232 |
| 5,893,058 | A | * | 4/1999 | Kosaka ........................ 704/254 |
| 6,021,387 | A | * | 2/2000 | Mozer et al. ................ 704/232 |
| 6,169,981 | B1 | * | 1/2001 | Werbos ........................ 706/23 |
| 6,238,342 | B1 | * | 5/2001 | Feleppa et al. ............. 600/437 |
| 6,571,227 | B1 | * | 5/2003 | Agrafiotis et al. ............ 706/15 |

FOREIGN PATENT DOCUMENTS

| EP | 0935212 | 8/1999 |
| WO | 9200572 | 1/1992 |

OTHER PUBLICATIONS

Jorgensen et al., "Theoretical Analysis and Improved Decision Criteria for the n-Tuple Classifier", IEEE Transactions on Pattern Analysis and Machine Intelligence, vol. 21, No. 4, Apr. 1999.*

Jorgensen et al., "Boosting the Performance of Weightless Neural Networks by Using a Post-Processing Transformation of the Output Scores", International Joint Conference on Neural Networks, Jul. 1999, vol. 2, pp. 812-816.*

(Continued)

*Primary Examiner*—Anthony Knight
*Assistant Examiner*—Michael B. Holmes
(74) *Attorney, Agent, or Firm*—Birch, Stewart, Kolasch & Birch, LLP

(57) ABSTRACT

The invention relates to n-tuple or RAM based neural network classification methods and systems and, more particularly, to n-tuple or RAM based classification systems where the decision criteria applied to obtain the output sources and compare these output sources to obtain a classification are determined during a training process. Accordingly, the invention relates to a system and a method of training a computer classification system which can be defined by a network comprising a number of n-tuples or Look Up Tables (LUTs), with each n-tuple or LUT comprising a number of rows corresponding to at least a subset of possible classes and comprising columns being addressed by signals or elements of sampled training input data examples.

60 Claims, 6 Drawing Sheets

OTHER PUBLICATIONS

Simoes et al., "The Adaptive Weight Using RAM", 1997 International Conference on Systems, Man and Cybernetics, Oct. 1997, vol. 5, pp. 4053-4056.*

Lucas et al., "Recognition of Chain-Coded Handwritten Character Images With Scanning n-Tuple Method", Electronic Letters, Nov. 1995, vol. 34, No. 24.*

Jung et al., "Joint Feature and Classifier Design for OCR", Proceedings of the 3rd International Conference on Document Analysis and Recognition, Aug. 1995, vol. 2, pp. 1115-1118.*

Allinson et al., "Neurons, N-Tuples and Faces", Computing and Control Engineering Journal, Jul. 1990.*

Lucas et al., "Statistical Syntactic Methods for High-Performance OCR", IEE Proceedings-Visual Image Signal Process, Feb. 1996, vol. 143, No. 1.*

Lucas, S., "Rapid Content-Based Retrieval from Document Image Databases", IEEE Colloquium on Intelligent Image Databases, May 1996.*

Bradshaw et al., "Improving the Generalisation of the N-Tuple Classifier Using the Effective VC Dimension", Electronics Letters Sep. 1996, vol. 32, No. 20.*

Lucas, S., "Can Scanning N-Tuple Classifiers be Improved by Pre-transforming Training Data?", IEE Workshop on Handwriting Analysis and Recognition-A European Perspective, May 1996.*

Lucas, S., "Continuous N-Tuple Classifier and Its Application to Face Recognition", Electronic Letters, Sep. 1997, vol. 33, No. 20.*

Jorgensen et al., "Nonlinear Noise Filtering and Texture Recognition by an Optoelectronic Neural Network That Implements a Mean Field Annealing Algorithm", Proceedings of the 1993 International Joint Conference on Neural Networks.*

Jorgensen, T., "A RAM-based Neural Net with Inhibitory Weights and its Application to Recognising Handwritten Digits", International Workshop on Neural Networks for Identification, Control, Robotics and Signal/Image Processing, Aug. 1996.*

Jung et al., "N-Tuple Features for OCR Revisited", IEEE Transactions on Pattern Analysis and Machine Intelligence, Jul. 1996, vol. 18, No. 7.*

Allinson et al., "A Principled Approach to N-Tuple Recognition Systems", IEE Colloquium on Pattern Recognition, Feb. 1997.*

Linneberg et al., "Towards Semen Quality Assessment Using Neural Networks", Proceedings of the 1994 IEEE Workshop on Neural Networks for Signal Processing, Sep. 1994, pp. 509-517.*

Linneberg et al., "Discretization Methods for Encoding of Continuous Input Variables for Boolean Neural Networks", Internation Joint Conference on Neural Networks, Jul. 1999, vol. 2, pp. 1219-1224.*

Kolcz et al., "Application fo the CMAC Input Encoding Scheme in the N-Tuple Approximation Network", IEE Proceedings-Computers and Digital Techniques, May 1994, vol. 141, Iss 3.*

Bishop et al., "Auto-Associative Memory Using N-Tuple Techniques", Intelligent Systems Engineering, Winter 1994.*

Rohwer, R., "Two Bayesian Treatments of the N-Tuple Recognition Method", Artificial Neural Networks, Jun. 1995.*

Duslim et al., "P Pattern Recognition Based on a Probablistic RAM Net Using N-Tuple Input Mapping", IEE Proceedings-Vision Image and Signal Processing, Dec. 1998, vol. 145, Iss 6.*

Guoqing et al., "A Novel Adaptive Pattern Recognition Model with Sparse Associative Memory Networks", 1991 IEEE International Joint Conference on Neural Networks, Nov. 1991, vol. 1, pp. 272-280.*

Williams et al., "Hardware Implementation of RAM-Based Neural Networks for Tomographic Data Processing", IEE Proceedings-Computers and Digital Techniques, Mar. 1999, vol. 146, Iss 2.*

Austin, Jr., "A Review of RAM Based Neural Networks", Proceedings of the 4th International Conference on Microelectronics for Neural Networks and Fuzzy Systems, Sep. 1994.*

Bledsoe, W.W. and Browning, I., 1959. Pattern Recognition and Reading by Machine. *Proceedings of the Eastern Joint Computer Conference.* pp. 225-232.

Morciniec, M. and Rohwer, R., 1996. A Theoretical and Experimental Account of n-tuple Classifier Performance. *Neural Comp.,* pp. 629-642.

T.M. Jorgensen, S.S. Christensen, and C. Liisberg. Cross-validation and information measures for RAM based neural networks. RAM-based neural networks. J. Austin, ed., World Scientific, London, pp. 78-88, 1998.

Jorgensen, T.M. Classification of handwritten digits using a ram neural net architecture. *International Journal of Neural Systems.* vol. 8, No. 1 (Feb. 1997) 17-25.

Jorgensen, T.M., Linneberg, C. Theoretical Analysis and Improved Decision Criteria for the n-Tuple Classifier. *IEEE Transactions on pattern analysis and machine intelligence.* vol. 21, No. 4, Apr. 1999.

EP 0 935 212 A1 Intellix A/S.

WO 92/00572 University College London.

Jorgensen et al, IEEE Transactions on Pattern Analysis & Machine, vol. 10, No. 4, Apr. 1999.

Jorgensen, International Journal of Neural Systems, vol. 8, No. 1, p. 17-p. 25 Feb. 1997.

* cited by examiner

N-TUPLE OR RAM BASED NEURAL NETWORK CLASSIFICATION SYSTEM AND METHOD

This application is the national phase under 35 U.S.C. § 371 of PCT International Application No. PCT/DK99/00340 which has an International filing date of Jun. 21, 1999, which designated the United States of America.

BACKGROUND OF THE INVENTION

1. Field of the Invention

The present invention relates generally to n-tuple or RAM based neural network classification systems and, more particularly, to n-tuple or RAM based classification systems where the decision criteria applied to obtain the output scores and compare these output scores to obtain a classification are determined during a training process.

2. Description of the Prior Art

A known way of classifying objects or patterns represented by electric signals or binary codes and, more precisely, by vectors of signals applied to the inputs of neural network classification systems lies in the implementation of a so-called learning or training phase. This phase generally consists of the configuration of a classification network that fulfils a function of performing the envisaged classification as efficiently as possible by using one or more sets of signals, called learning or training sets, where the membership of each of these signals in one of the classes in which it is desired to classify them is known. This method is known as supervised learning or learning with a teacher.

A subclass of classification networks using supervised learning are networks using memory-based learning. Here, one of the oldest memory-based networks is the "n-tuple network" proposed by Bledsoe and Browning (Bledsoe, W. W. and Browning, I, 1959, "Pattern recognition and reading by machine", Proceedings of the Eastern Joint Computer Conference, pp. 225–232) and more recently described by Morciniec and Rohwer (Morciniec, M. and Rohwer, R., 1996, "A theoretical and experimental account of n-tuple classifier performance", Neural Comp., pp. 629–642).

One of the benefits of such a memory-based system is a very fast computation time, both during the learning phase and during classification. For the known types of n-tuple networks, which is also known as "RAM networks" or "weightless neural networks", learning may be accomplished by recording features of patterns in a random-access memory (RAM), which requires just one presentation of the training set(s) to the system.

The training procedure for a conventional RAM based neural network is described by Jørgensen (co-inventor of this invention) et al. in a contribution to a recent book on RAM based neural networks (T. M. Jørgensen, S. S. Christensen, and C. Liisberg, "Cross-validation and information measures for RAM based neural networks," RAM-based neural networks, J. Austin, ed., World Scientific, London, pp. 78–88, 1998). The contribution describes how the RAM based neural network may be considered as comprising a number of Look Up Tables (LUTs). Each LUT may probe a subset of a binary input data vector. In the conventional scheme the bits to be used are selected at random. The sampled bit sequence is used to construct an address. This address corresponds to a specific entry (column) in the LUT. The number of rows in the LUT corresponds to the number of possible classes. For each class the output can take on the values 0 or 1. A value of 1 corresponds to a vote on that specific class. When performing a classification, an input vector is sampled, the output vectors from all LUTs are added, and subsequently a winner takes all decision is made to classify the input vector. In order to perform a simple training of the network, the output values may initially be set to 0. For each example in the training set, the following steps should then be carried out:

Present the input vector and the target class to the network, for all LUTs calculate their corresponding column entries, and set the output value of the target class to 1 in all the "active" columns.

By use of such a training strategy it may be guaranteed that each training pattern always obtains the maximum number of votes on the true class. As a result such a network makes no misclassification on the training set, but ambiguous decisions may occur. Here, the generalisation capability of the network is directly related to the number of input bits for each LUT. If a LUT samples all input bits then it will act as a pure memory device and no generalisation will be provided. As the number of input bits is reduced the generalisation is increased at an expense of an increasing number of ambiguous decisions. Furthermore, the classification and generalisation performances of a LUT are highly dependent on the actual subset of input bits probed. The purpose of an "intelligent" training procedure is thus to select the most appropriate subsets of input data.

Jørgensen et al. further describes what is named a "leave-one-out cross-validation test" which suggests a method for selecting an optimal number of input connections to use per LUT in order to obtain a low classification error rate with a short overall computation time. In order to perform such a cross-validation test it is necessary to obtain a knowledge of the actual number of training examples that have visited or addressed the cell or element corresponding to the addressed column and class. It is therefore suggested that these numbers are stored in the LUTs. It is also suggested by Jørgensen et al. how the LUTs in the network can be selected in a more optimum way by successively training new sets of LUTs and performing cross validation test on each LUT. Thus, it is known to have a RAM network in which the LUTs are selected by presenting the training set to the system several times.

The output vector from the RAM network contains a number of output scores, one for each possible class. As mentioned above a decision is normally made by classifying an example in to the class having the largest output score. This simple winner-takes-all (WTA) scheme assures that the true class of a training examples cannot lose to one of the other classes. One problem with the RAM net classification scheme is that it often behaves poorly when trained on a training set where the distribution of examples between the training classes are highly skewed. Accordingly there is a need for understanding the influence of the composition of the training material on the behaviour of the RAM classification system as well as a general understanding of the influence of specific parameters of the architecture on the performance. From such an understanding it could be possible to modify the classification scheme to improve its performance and competitiveness with other schemes. Such improvements of the RAM based classification systems is provided according to the present invention.

SUMMARY OF THE INVENTION

Recently Thomas Martini Jørgensen and Christian Linneberg (inventors of this invention) have provided a statistical framework that have made it possible to make a theoretical analysis that relates the expected output scores of the n-tuple net to the stochastic parameters of the example distributions, the number of available training examples, and the number of address lines n used for each LUT or n-tuple. From the obtained expressions, they have been able to study the behaviour of the architecture in different scenarios. Furthermore, they have based on the theoretical results come up with proposals for modifying the n-tuple classification scheme in order to make it operate as a close approximation to the maximum a posteriori or maximum likelihood estimator. The resulting modified decision criteria can for example deal with the so-called skewed class prior problem causing the n-tuple net to often behave poorly when trained on a training set where the distribution of examples between the training classes are highly skewed. Accordingly the proposed changes of the classification scheme provides an essential improvement of the architecture. The suggested changes in decision criteria are not only applicable to the original n-tuple architecture based on random memorisation. It also applies to extended n-tuple schemes, some of which use a more optimal selection of the address lines and some of which apply an extended weight scheme.

According to a first aspect of the present invention there is provided a method for training a computer classification system which can be defined by a network comprising a number of n-tuples or Look Up Tables (LUTs), with each n-tuple or LUT comprising a number of rows corresponding to at least a subset of possible classes and further comprising a number of columns being addressed by signals or elements of sampled training input data examples, each column being defined by a vector having cells with values, said method comprising determining the column vector cell values based on one or more training sets of input data examples for different classes so that at least part of the cells comprise or point to information based on the number of times the corresponding cell address is sampled from one or more sets of training input examples. The method further comprises determining one or more output score functions for evaluation of at least one output score value per class, and/or determining one or more decision rules to be used in combination with at least part of the obtained output score values to determine a winning class.

It is preferred that the output score values are evaluated or determined based on the information of at least part of the determined column vector cell values.

According to the present invention it is preferred that the output score functions and/or the decision rules are determined based on the information of at least part of the determined column vector cell values.

It is also preferred to determine the output score functions from a family of output score functions determined by a set of parameter values. Thus, the output score functions may be determined either from the set of parameter values, from the information of at least part of the determined column vector cell values or from both the set of parameter values and the information of at least part of the determined column vector cell values.

It should be understood that the training procedure of the present invention may be considered a two step training procedure. The first step may comprise determining the column vector cell values, while the second step may comprise determining the output score functions and/or the decision rules.

As already mentioned, the column vector cells are determined based on one or more training sets of input data examples of known classes, but the output score functions and/or the decision rules may be determined based on a validation set of input data examples of known classes. Here the validation set may be equal to or part of the training set(s), but the validation set may also be a set of examples not included in the training set(s).

According to the present invention the training and/or validation input data examples may preferably be presented to the network as input signal vectors.

It is preferred that determination of the output score functions is performed so as to allow different ways of using the contents of the column vector cells in calculating the output scores used to find the winning class amongst two or more classes. The way the contents of the column vector cells are used to obtain the score of one class might depend on which class(es) it is compared with.

It is also preferred that the decision rules used when comparing two or more classes in the output space are allowed to deviate from the decision rules corresponding to a WTA decision. Changing the decision rules for choosing two or more classes is equivalent to allowing individual transformation of the class output scores and keeping a WTA comparison. These corresponding transformations might depend on which class(es) a given class is compared with.

The determination of how the output score functions may be calculated from the column vector cell values, as well as the determination of how many output score functions to use and/or the determination of the decision rules to be applied on the output score values may comprise the initialisation of one or more sets of output score functions and/or decision rules.

Furthermore it is preferred to adjust at least part of the output score functions and/or the decision rules based on an information measure evaluating the performance on the validation example set. If the validation set equals the training set or part of the training set it is preferred to use a leave-one-out cross-validation evaluation or extensions of this concept.

In order to determine or adjust the output score functions and the decision rules according to the present invention, the column cell values should be determined. Here, it is preferred that at least part of the column cell values are determined as a function of the number of times the corresponding cell address is sampled from the set(s) of training input examples. Alternatively, the information of the column cells may be determined so that the maximum column cell value is 1, but at least part of the cells have an associated value being a function of the number of times the corresponding cell address is sampled from the training set(s) of input examples. Preferably, the column vector cell values are determined and stored in storing means before the determination or adjustment of the output score functions and/or the decision rules.

According to the present invention, a preferred way of determining the column vector cell values may comprise the training steps of a) applying a training input data example of a known class to the classification network, thereby addressing one or more column vectors, b) incrementing, preferably by one, the value or vote of the cells of the addressed column vector(s) corresponding to the row(s) of the known class, and c) repeating steps (a)–(b) until all training examples have been applied to the network.

However, it should be understood that the present invention also covers embodiments where the information of the column cells is determined by alternative functions of the number of times the cell has been addressed by the input training set(s). Thus, the cell information does not need to comprise a count of all the times the cell has been addressed, but may for example comprise an indication of when the cell has been visited zero times, once, more than once, and/or twice and more than twice and so on.

In order to determine the output score functions and/or the decision rules, it is preferred to adjust these output score functions and/or decision rules, which adjustment process may comprise one or more iteration steps. The adjustment of the output score functions and/or the decision rules may comprise the steps of determining a global quality value based on at least part of the column vector cell values, determining if the global quality value fulfils a required quality criterion, and adjusting at least part of output score functions and/or part of the decision rules until the global quality criterion is fulfilled.

The adjustment process may also include determination of a local quality value for each sampled validation input example, with one or more adjustments being performed if the local quality value does not fulfil a specified or required local quality criterion for the selected input example. As an example the adjustment of the output score functions and/or the decision rules may comprise the steps of
  a) selecting an input example from the validation set(s),
  b) determining a local quality value corresponding to the sampled validation input example, the local quality value being a function of at least part of the addressed column cell values,
  c) determining if the local quality value fulfils a required local quality criterion, if not, adjusting one or more of the output score functions and/or decision rules if the local quality criterion is not fulfilled,
  d) selecting a new input example from a predetermined number of examples of the validation set(s),
  e) repeating the local quality test steps (b)–(d) for all the predetermined validation input examples,
  f) determining a global quality value based on at least part of the column vectors being addressed during the local quality test,
  g) determining if the global quality value fulfils a required global quality criterion, and,
  h) repeating steps (a)–(g) until the global quality criterion is fulfilled.

Preferably, steps (b)–(d) of the above mentioned adjustment process may be carried out for all examples of the validation set(s).

The local and/or global quality value may be defined as functions of at least part of the column cells.

It should be understood that when adjusting the output score functions and/or decision rules by use of one or more quality values each with a corresponding quality criterion, it may be preferred to stop the adjustment iteration process if a quality criterion is not fulfilled after a given number of iterations.

It should also be understood that during the adjustment process the adjusted output score functions and/or decision rules are preferably stored after each adjustment, and when the adjustment process includes the determination of a global quality value, the step of determination of the global quality value may further be followed by separately storing the hereby obtained output score functions and/or decision rules or classification system configuration values if the determined global quality value is closer to fulfil the global quality criterion than the global quality value corresponding to previously separately stored output score functions and/or decision rules or configuration values.

A main reason for training a classification system according to an embodiment of the present invention is to obtain a high confidence in a subsequent classification process of an input example of an unknown class.

Thus, according to a further aspect of the present invention, there is also provided a method of classifying input data examples into at least one of a plurality of classes using a computer classification system configured according to any of the above described methods of the present invention, whereby column cell values for each n-tuple or LUT and output score functions and/or decision rules are determined using on one or more training or validation sets of input data examples, said method comprising
  a) applying an input data example to be classified to the configured classification network thereby addressing column vectors in the set of n-tuples or LUTs,
  b) selecting a set of classes which are to be compared using a given set of output score functions and decision rules thereby addressing specific rows in the set of n-tuples or LUTs,
  c) determining output score values as a function of the column vector cells and using the determined output score functions,
  d) comparing the calculated output values using the determined decision rules, and
  e) selecting the class or classes that win(s) according to the decision rules.

The present invention also provides training and classification systems according to the above described methods of training and classification.

Thus, according to the present invention there is provided a system for training a computer classification system which can be defined by a network comprising a stored number of n-tuples or Look Up Tables (LUTs), with each n-tuple or LUT comprising a number of rows corresponding to at least a subset of possible classes and further comprising a number of columns being addressed by signals or elements of sampled training input data examples, each column being defined by a vector having cells with values, said system comprising
  input means for receiving training input data examples of known classes,
  means for sampling the received input data examples and addressing column vectors in the stored set of n-tuples or LUTs,
  means for addressing specific rows in the set of n-tuples or LUTs, said rows corresponding to a known class,
  storage means for storing determined n-tuples or LUTs,
  means for determining column vector cell values so as to comprise or point to information based on the number of times the corresponding cell address is sampled from the training set(s) of input examples, and
  means for determining one or more output score functions and/or one or more decision rules.

Here, it is preferred that the means for determining the output score functions and/or decision rules is adapted to determine these functions and/or rules based on the information of at least part of the determined column vector cell values.

The means for determining the output score functions may be adapted to determine such functions from a family of output score functions determined by a set of parameter values. Thus, the means for determining the output score functions may be adapted to determine such functions either from the set of parameter values, from the information of at least part of the determined column vector cell values or from both the set of parameter values and the information of at least part of the determined column vector cell values.

According to the present invention the means for determining the output score functions and/or the decision rules may be adapted to determine such functions and/or rules based on a validation set of input data examples of known classes. Here the validation set may be equal to or part of the training set(s) used for determining the column cell values, but the validation set may also be a set of examples not included in the training set(s).

In order to determine the output score functions and decision rules according to a preferred embodiment of the present invention, the means for determining the output score functions and decision rules may comprise means for initialising one or more sets output score functions and/or decision rules, and means for adjusting output score functions and decision rules by use of at least part of the validation set of input examples.

As already discussed above the column cell values should be determined in order to determine the output score functions and decision rules. Here, it is preferred that the means for determining the column vector cell values is adapted to determine these values as a function of the number of times the corresponding cell address is sampled from the set(s) of training input examples. Alternatively, the means for determining the column vector cell values may be adapted to determine these cell values so that the maximum value is 1, but at least part of the cells have an associated value being a function of the number of times the corresponding cell address is sampled from the training set(s) of input examples.

According to an embodiment of the present invention it is preferred that when a training input data example belonging to a known class is applied to the classification network thereby addressing one or more column vectors, the means for determining the column vector cell values is adapted to increment the value or vote of the cells of the addressed column vector(s) corresponding to the row(s) of the known class, said value preferably being incremented by one.

For the adjustment process of the output score functions and decision rules it is preferred that the means for adjusting output score functions and/or decision rules is adapted to determine a global quality value based on at least part of column vector cell values, determine if the global quality value fulfils a required global quality criterion, and adjust at least part of the output score functions and/or decision rules until the global quality criterion is fulfilled.

As an example of a preferred embodiment according to the present invention, the means for adjusting output score functions and decision rules may be adapted to a) determine a local quality value corresponding to a sampled validation input example, the local quality value being a function of at least part of the addressed vector cell values, b) determine if the local quality value fulfils a required local quality criterion, c) adjust one or more of the output score functions and/or decision rules if the local quality criterion is not fulfilled, d) repeat the local quality test for a predetermined number of training input examples, e) determine a global quality value based on at least part of the column vectors being addressed during the local quality test, f) determine if the global quality value fulfils a required global quality criterion, and, g) repeat the local and the global quality test until the global quality criterion is fulfilled.

The means for adjusting the output score functions and decision rules may further be adapted to stop the iteration process if the global quality criterion is not fulfilled after a given number of iterations. In a preferred embodiment, the means for storing n-tuples or LUTs comprises means for storing adjusted output score functions and decision rules and separate means for storing best so far output score functions and decision rules or best so far classification system configuration values. Here, the means for adjusting the output score functions and decision rules may further be adapted to replace previously separately stored best so far output score functions and decision rules with obtained adjusted output score functions and decision rules if the determined global quality value is closer to fulfil the global quality criterion than the global quality value corresponding to previously separately stored best so far output score functions and decision rules. Thus, even if the system should not be able to fulfil the global quality criterion within a given number of iterations, the system may always comprise the "best so far" system configuration.

According to a further aspect of the present invention there is also provided a system for classifying input data examples of unknown classes into at least one of a plurality of classes, said system comprising:

storage means for storing a number or set of n-tuples or Look Up Tables (LUTs) with each n-tuple or LUT comprising a number of rows corresponding to at least a subset of the number of possible classes and further comprising a number of column vectors, each column vector being addressed by signals or elements of a sampled input data example, and each column vector having cell values being determined during a training process based on one or more sets of training input data examples, storage means for storing one ore more output score functions and/or one or more decision rules, each output score function and/or decision rule being determined during a training or validation process based on one or more sets of validation input data examples, said system further comprising:

input means for receiving an input data example to be classified, means for sampling the received input data example and addressing column vectors in the stored set of n-tuples or LUTs, means for addressing specific rows in the set of n-tuples or LUTs, said rows corresponding to a specific class, means for determining output score values using the stored output score functions and at least part of the stored column vector values, and means for determining a winning class or classes based on the output score values and stored decision rules.

It should be understood that it is preferred that the cell values of the column vectors and the output score functions and/or decision rules of the classification system according to the present invention are determined by use of a training system according to any of the above described systems. Accordingly, the column vector cell values and the output score functions and/or decision rules may be determined during a training process according to any of the above described methods.

BRIEF DESCRIPTION OF THE DRAWINGS

For a better understanding of the present invention and in order to show how the same may be carried into effect, reference will now be made by way of example to the accompanying drawings in which.

DETAILED DESCRIPTION OF THE INVENTION

In the following a more detailed description of the architecture and concept of a classification system according to the present invention will be given including an example of a training process of the column cells of the architecture and an example of a classification process. Furthermore, different examples of learning processes for the output score functions and the decision rules according to embodiments of the present invention are described.

Notation

The notation used in the following description and examples is as follows:

| | |
|---|---|
| X: | The training set. |
| $\bar{x}$: | An example from the training set. |
| $N_X$: | Number of examples in the training set X. |
| $\bar{x}_j$: | The j'th example from a given ordering of the training set X. |
| $\bar{y}$: | A specific example (possible outside the training set). |
| C: | Class label. |
| $C(\bar{x})$: | Class label corresponding to example $\bar{x}$ (the true class). |
| $C_W$: | Winner Class obtained by classification. |
| $C_T$: | True class obtained by classification. |
| $N_C$: | Number of training classes corresponding to the maximum number of rows in a LUT. |
| $\Omega$: | Set of LUTs (each LUT may contain only a subset of all possible address columns, and the different columns may register only subsets of the existing classes). |
| $N_{LUT}$: | Number of LUTs. |
| $N_{COL}$: | Number of different columns that can be addressed in a specific LUT (LUT dependent). |
| $X_C$: | The set of training examples labelled class C. |
| $v_{iC}$: | Entry counter for the cell addressed by the i'th column and the C'th class. |
| $a_i(\bar{y})$: | Index of the column in the i'th LUT being addressed by example $\bar{y}$. |
| $\bar{v}$: | Vector containing all $v_{iC}$ elements of the LUT network. |
| $Q_L$: | Local quality function. |
| $Q_G$: | Global quality function. |
| $B^{C_i,C_j}$: | Decision rule matrix |
| $M_{c_i,c_j}$: | Cost matrix |
| $S_\cdot$: | Score function |
| $\Gamma_\cdot$: | Leave-one-out cross-validation score function |
| P: | Path matrix |
| $\bar{\beta}$: | Parameter vector |
| $\Xi$: | Set of decision rules |
| $d_c$: | Score value on class c |
| $D(\cdot)$: | Decision function |

Description of Architecture and Concept

Figure 1:
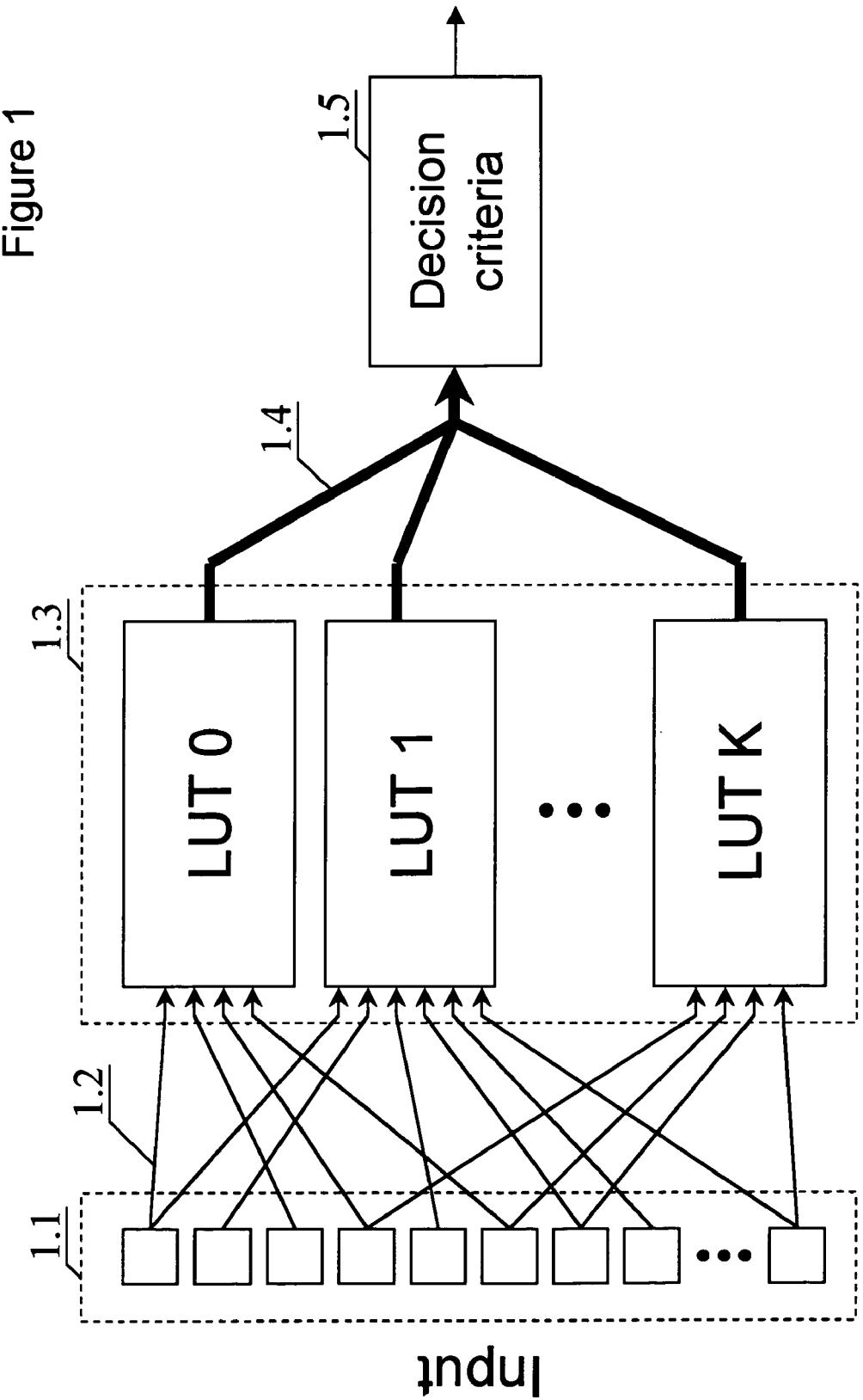
FIG. 1 shows a block diagram of a RAM classification network with Look Up Tables (LUTs)

In the following references are made to FIG. 1, which shows a block diagram of a RAM classification network with Look Up Tables (LUTs), and FIG. 2, which shows a detailed block diagram of a single Look Up Table (LUT) according to an embodiment of the present invention.

A RAM-net or LUT-net consists of a number of Look Up Tables (LUTs) (1.3). Let the number of LUTs be denoted $N_{LUT}$. An example of an input data vector $\bar{y}$ to be classified may be presented to an input module (1.1) of the LUT network. Each LUT may sample a part of the input data, where different numbers of input signals may be sampled for different LUTs (1.2) (in principle it is also possible to have one LUT sampling the whole input space). The outputs of the LUTs may be fed (1.4) to an output module (1.5) of the RAM classification network.

Figure 2:
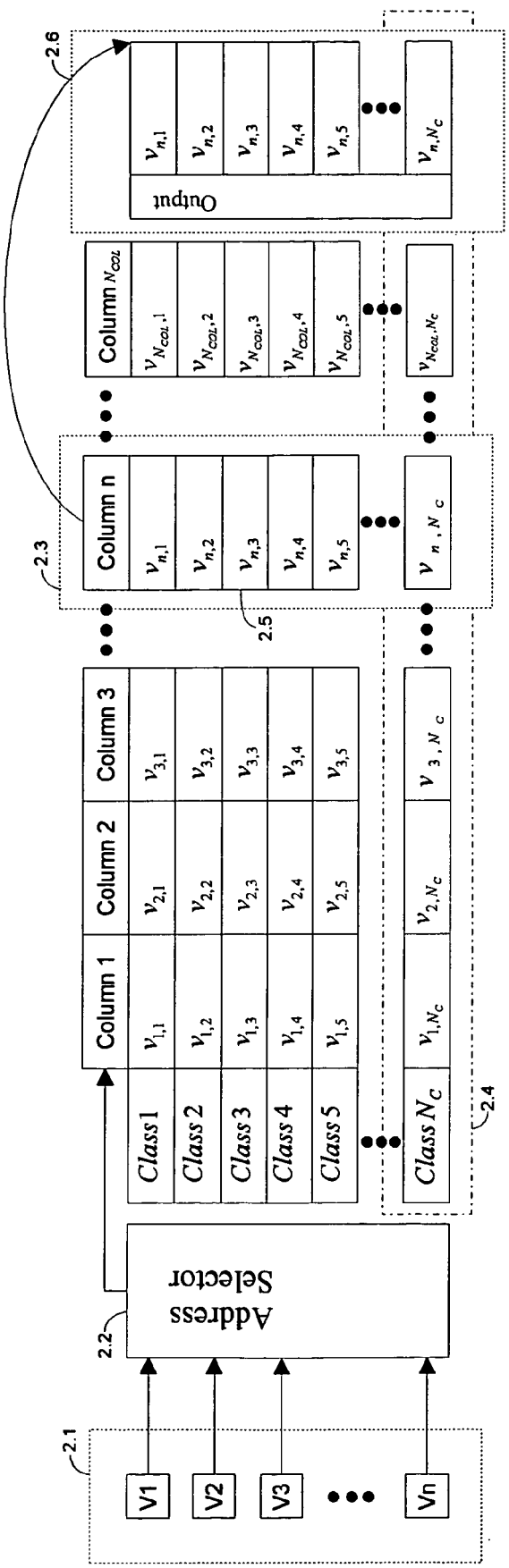
FIG. 2 shows a detailed block diagram of a single Look Up Table (LUT) according to an embodiment of the present invention.

In FIG. 2 it is shown that for each LUT the sampled input data (2.1) of the example presented to the LUT-net may be fed into an address selecting module (2.2). The address selecting module (2.2) may from the input data calculate the address of one or more specific columns (2.3) in the LUT. As an example, let the index of the column in the i'th LUT being addressed by an input example $\bar{y}$ be calculated as $a_i(\bar{y})$. The number of addressable columns in a specific LUT may be denoted $N_{COL}$, and varies in general from one LUT to another. The information stored in a specific row of a LUT may correspond to a specific class C (2.4). The maximum number of rows may then correspond to the number of classes, $N_C$. The number of cells within a column corresponds to the number of rows within the LUT. The column vector cells may correspond to class specific entry counters of the column in question. The entry counter value for the cell addressed by the i'th column and class C is denoted $v_{iC}$ (2.5).

The $v_{iC}$-values of the activated LUT columns (2.6) may be fed (1.4) to the output module (1.5), where one or more output scores may be calculated for each class and where these output scores in combinations with a number of decision rules determine the winning class.

Let $\bar{x} \in X$ denote an input data example used for training and let $\bar{y}$ denote an input data example not belonging to the training set. Let $C(\bar{x})$ denote the class to which $\bar{x}$ belongs. The class assignment given to the example $\bar{y}$ is then obtained by calculating one or more output scores for each class. The output scores obtained for class C is calculated as functions of the $v_{iC}$ numbers addressed by the example $\bar{y}$ but will in general also depend on a number of parameters $\bar{\beta}$. Let the $m^{th}$ output score of class C be denoted $S_{C,m}(v_{iC}, \bar{\beta})$ A classification is obtained by combining the obtained output scores from all classes with a number of decision rules. The effect of the decision rules is to define regions in the output score space that must be addressed by the output score values to obtain a given winner class. The set of decision rules is denoted $\Xi$ and corresponds to a set of decision borders.

Figure 3:
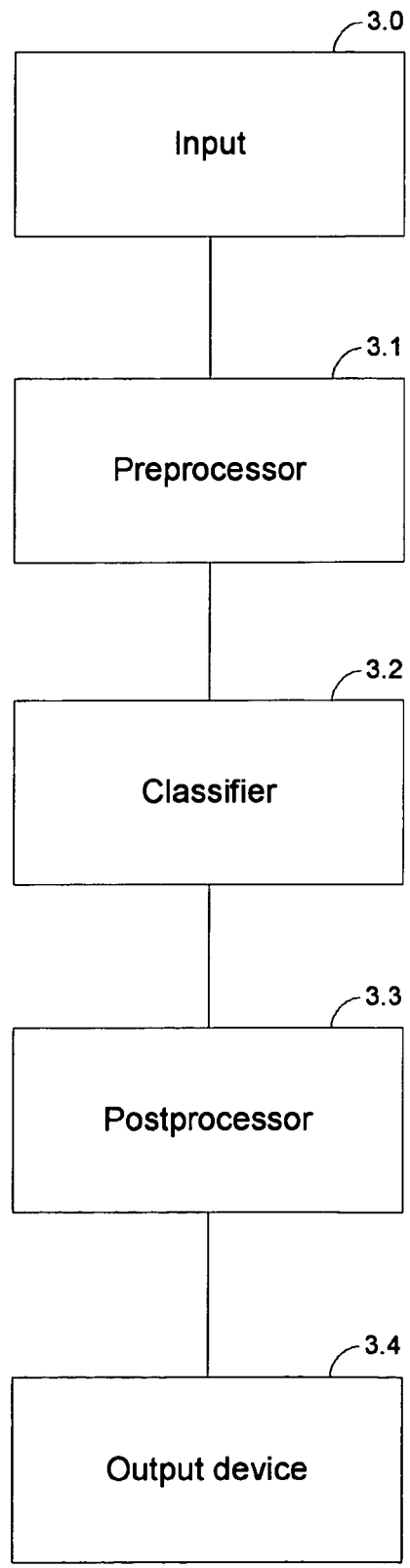
FIG. 3 shows a block diagram of a computer classification system according to the present invention.

FIG. 3 shows an example of a block diagram of a computer classification system according to the present invention. Here a source such as a video camera or a database provides an input data signal or signals (3.0) describing the example to be classified. These data are fed to a pre-processing module (3.1) of a type which can extract features, reduce, and transform the input data in a predetermined manner. An example of such a pre-processing module is a FFT-board (Fast Fourier Transform). The transformed data are then fed to a classification unit (3.2) comprising a RAM network according to the present invention. The classification unit (3.2) outputs a ranked classification list which might have associated confidences. The classification unit can be implemented by using software to programme a standard Personal Computer or programming a hardware device, e.g. using programmable gate arrays combined with RAM circuits and a digital signal processor. These data can be interpreted in a post-processing device (3.3), which could be a computer module combining the obtained classifications with other relevant information. Finally the result of this interpretation is fed to an output device (3.4) such as an actuator.

Initial Training of the Architecture

Figure 4:
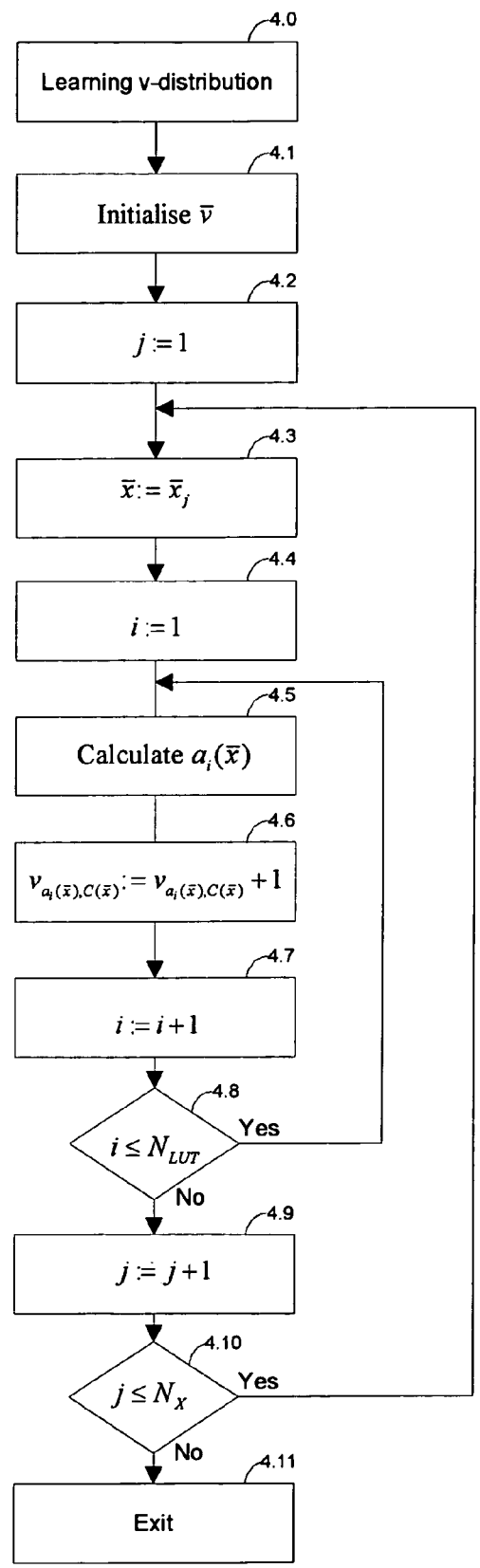
FIG. 4 shows a flow chart of a learning process for LUT column cells according to an embodiment of the present invention.

The flow chart of FIG. 4 illustrates a one pass learning scheme or process for the determination of the column vector entry counter or cell distribution, $v_{iC}$-distribution (4.0), according to an embodiment of the present invention, which may be described as follows:

1. Initialise all entry counters or column vector cells by setting the cell values, $\bar{v}$, to zero (4.1).
2. Present the first training input example, $\bar{x}_1$, from the training set X to the network (4.2, 4.3).
3. Calculate the columns addressed for the first LUT (4.4, 4.5).
4. Add 1 to the entry counters in the rows of the addressed columns that correspond to the class label of $\bar{x}$ (increment $v_{a_i(\bar{x}),C(\bar{x})}$ in all LUTs) (4.6).
5. Repeat step 4 for the remaining LUTs (4.7, 4.8).
6. Repeat steps 3–5 for the remaining training input examples (4.9, 4.10). The number of training examples is denoted $N_X$.

Initialisation of Output Score Functions and Decision Rules

Before the trained network can be used for classification the output score functions and the decision rules must be initialised.

Classification of an Unknown Input Example

When the RAM network of the present invention has been trained to thereby determine values for the column cells whereby the LUTs may be defined, the network may be used for classifying an unknown input data example.

Figure 6:
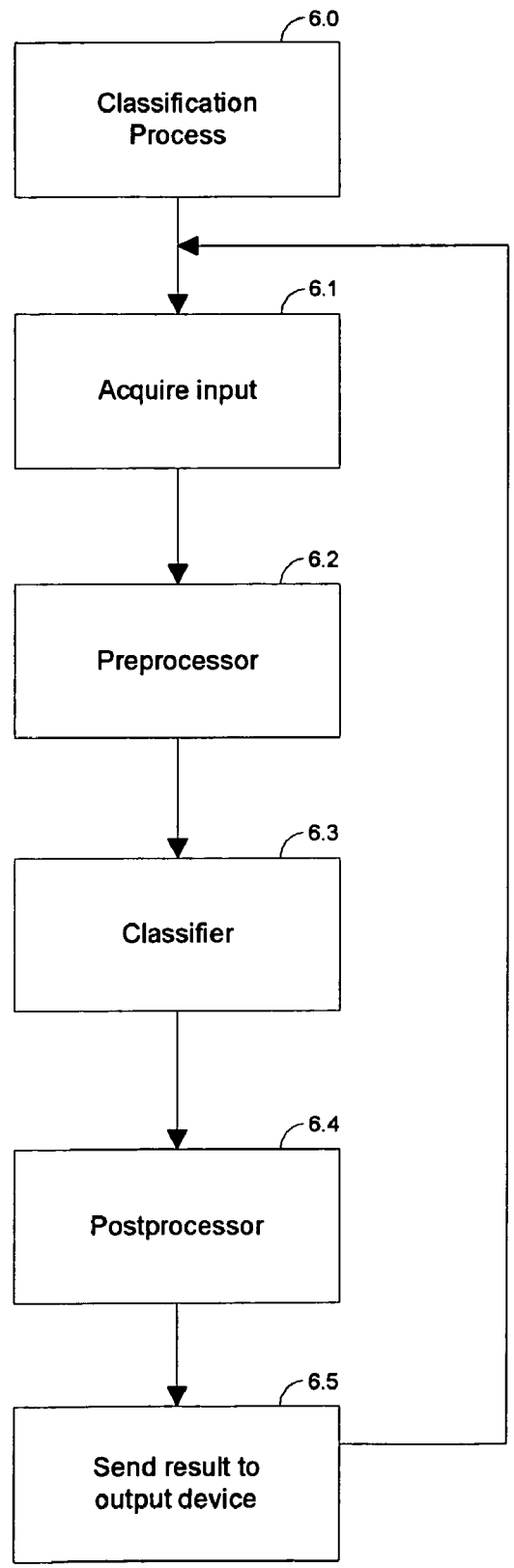
FIG. 6 shows a flow chart of a classification process according to the present invention.

In a preferred example according to the present invention, the classification is performed by using the decision rules $\Xi$ and the output scores obtained from the output score functions. Let the decision function invoking $\Xi$ and the output scores be denoted $D(\bullet)$. The winning class can then be written as:

Winner Class=$D(\Xi, S_{1,1}, S_{1,2}, \ldots S_{1,p} \ldots S_{2,1}, \ldots S_{2,k} \ldots S_{1,m})$ FIG. 6 shows a block diagram of the operation of a computer classification system in which a classification process (6.0) is performed. The system acquires one or more input signals (6.1) using e.g. an optical sensor system. The obtained input data are preprocessed (6.2) in a pre-processing module, e.g. a low-pass filter, and presented to a classification module (6.3) which according to an embodiment of the invention may be a LUT-network. The output data from the classification module is then post-processed in a post-processing module (6.4), e.g. a CRC algorithm calculating a cyclic redundancy check sum, and the result is forwarded to an output device (6.5), which could be a monitor screen.

Adjustment of Output Score Function Parameter $\bar{\beta}$ and Adjustment of Decision Rules $\Xi$ Usually the initially determined values of $\bar{\beta}$ and the initial set of rules $\Xi$ will not present the optimal choices. Thus, according to a preferred embodiment of the present invention, an optimisation or adjustment of the $\bar{\beta}$ values and the $\Xi$ rules should be performed.

In order to select or adjust the parameters $\bar{\beta}$ and the rules $\Xi$ to improve the performance of the classification system, it is suggested according to an embodiment of the invention to define proper quality functions for measuring the performance of the $\bar{\beta}$-values and the $\Xi$-rules. Thus, a local quality function $Q_L(\bar{v},\bar{x}, X,\bar{\beta},\Xi)$ may be defined, where $\bar{v}$ denotes a vector containing all $v_{iC}$ elements of the LUT network. The local quality function may give a confidence measure of the output classification of a specific example $\bar{x}$. If the quality value does not satisfy a given criterion the $\bar{\beta}$ values and the $\Xi$ rules are adjusted to make the quality value satisfy or closer to satisfying the criterion (if possible).

Furthermore a global quality function: $Q_G(\bar{v}, X, \bar{\beta}, \Xi)$ may be defined. The global quality function may measure the performance of the input training set as a whole.

Figure 5:
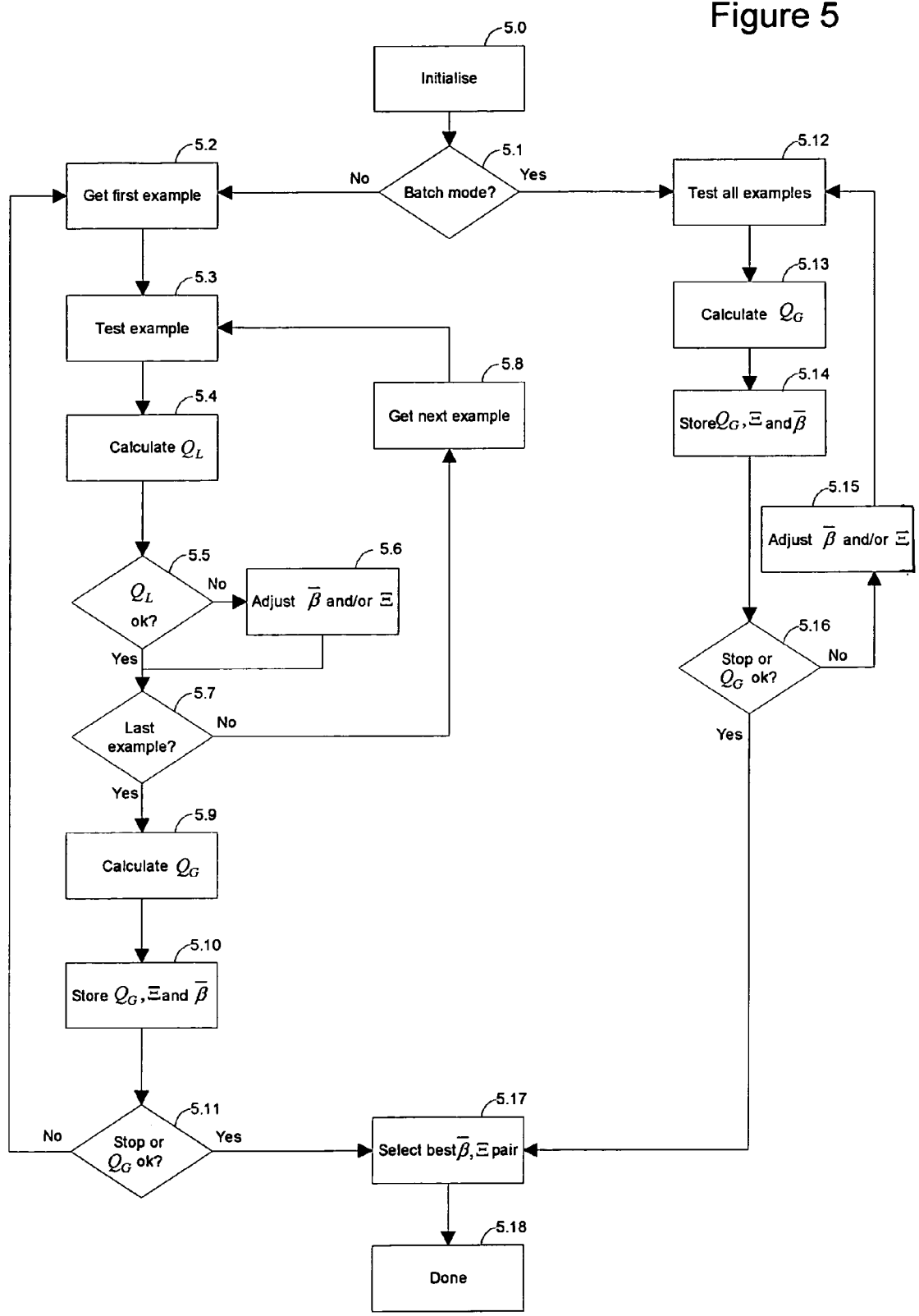
FIG. 5 shows a flow chart of a learning process according to a embodiment of the present invention.

FIG. 5 shows a flow chart for adjustment or learning of the $\bar{\beta}$ values and the $\Xi$ rules according to the present invention.

EXAMPLE 1

20 This example illustrates an optimisation procedure for adjusting the decision rules $\Xi$.

We consider $N_c$ training classes. The class label c is an integer running from 1 to $N_c$.

For each class c we define a single output score function:

$$S_c(v_{a_1(\bar{x}),c}, \bar{\beta}) = \sum_{i \in \Omega} \beta_i \Theta_k(v_{a_1(\bar{x}),c}), \bar{\beta} = (\beta_1, \beta_2, \ldots)$$

where $\delta_{i,j}$ is Kroneckers delta ($\delta_{i,j}=1$ if i=j and 0 otherwise), and $$\Theta_k(z) = \begin{cases} 1 & \text{if } z \geq k \\ 0 & \text{if } z < k \end{cases}.$$

The expression for the output score function illustrates a possible family of functions determined by a parameter vector $\bar{\beta}$. This example, however, will only illustrate a procedure for adjusting the decision rules $\Xi$, and not $\bar{\beta}$. For simplicity of notation we therefore initialise all values in $\bar{\beta}$ to one. We then have:

$$S_c(v_{a_1(\bar{x}),c}) = \sum_{i \in \Omega} \Theta_k(v_{a_1(\bar{x}),c}).$$

With this choice of $\bar{\beta}$ the possible output values for $S_c$ are the integers from 0 to $N_{LUT}$ (both inclusive).

The leave-one-out cross-validation score or vote-count on a given class c is:

$$\Gamma_c(\bar{x}) = \sum_{i \in \Omega} \Theta_{k+\delta_{C_T(\bar{x}),c}}(v_{a_i(\bar{x}),c}),$$

where $C_T(\bar{x})$ denotes the true class of example $\bar{x}$.

For all possible inter-class combinations $(c_1,c_2)$, $(c_1 \in \{1,2 \ldots N_c\}, c_2 \in \{1,2, \ldots N_c\})^\wedge(c_1 \neq c_2)$ we wish to determine a suitable decision border in the score space spanned by the two classes. The matrix $B^{c_1,c_2}$ is defined to contain the decisions corresponding to a given set of decision rules applied to the two corresponding output score values; i.e whether class $c_1$ or class $c_2$ wins. The row and column dimensions are given by the allowed ranges of the two output score values, i.e. the matrix dimension is $(N_{LUT}+1) \times (N_{LUT}+1)$. Accordingly, the row and column indexes run from 0 to $N_{LUT}$.

Each matrix element contains one of the following three values: $c_1, c_2$ and $k_{AMB}$, where $k_{AMB}$ is a constant different from $c_1$ and $c_2$. Here we use $k_{AMB}=0$. The two output score values $S_1$ and $S_2$ obtained for class $c_1$ and class $c_2$, respectively, are used to address the element $b_{S_1,S_2}^{c_1,c_2}$ in the matrix $B^{c_1,c_2}$. If the addressed element contains the value $c_1$ it means that class $c_1$ wins over class $c_2$. If the addressed element contains the value $c_2$ it means that class $c_2$ wins over class $c_1$. Finally, if the addressed element contains the value $k_{AMB}$, it means the decision is ambiguous.

The decision rules are initialised to correspond to a WTA decision. This corresponds to having a decision border along the diagonal in the matrix $B^{c_1,c_2}$. Along the diagonal the elements are initialised to take on the value $k_{AMB}$. Above and respectively below the diagonal the elements are labelled with opposite class values.

A strategy for adjusting the initialised decision border according to an information measure that uses the $v_{a_i(\bar{x}),c}$ values is outlined below.

Create the cost matrix $M^{c_1,c_2}$ with elements given as:

$$m_{i,j} = \alpha_{c_1,c_2} \sum_{\bar{x} \in X_{c_1}} (\Gamma_{c_1}(\bar{x}) \leq i \wedge \Gamma_{c_2}(\bar{x}) \geq j) +$$

$$\alpha_{c_2,c_1} \sum_{\bar{x} \in X_{c_2}} (\Gamma_{c_1}(\bar{x}) \geq i \wedge \Gamma_{c_2}(\bar{x}) \leq j)$$

$\alpha_{c_1,c_2}$ denotes the cost associated with classifying an example from class $c_1$ in to class $c_2$ and $\alpha_{c_2,c_1}$ denotes the cost associated with the opposite error. It is here assumed that a logical true evaluates to one and a logical false evaluates to zero.

A minimal-cost path from $m_{0,0}$ to $m_{N_{LUT},N_{LUT}}$ can be calculated using e.g. a dynamic programming approach as shown by the following pseudo-code: (the code uses a path matrix $P^{c_1,c_2}$ with the same dimensions as $B^{c_1,c_2}$).

// Loop through all entries in the cost matrix in reverse order:

```
for i := N_LUT to 0 step -1
{
    for j := N_LUT to 0 step -1
    {
        if ((i < > N_LUT ) and (j < > N_LUT ))
        {
            // For each entry, calculate the lowest
            // associated total-costs given as
            m_i,j := m_i,j + min(m_i+1,j, m_i+1,j+1, m_i,j+1);
            // (Indexes outside the matrix are considered
            // as addressing the value of infinity)
            if (min(m_i+1,j, m_i+1,j+1, m_i,j+1) = = m_i+1,j) p_i,j := 1;
            if (min(m_i+1,j, m_i+1,j+1, m_i,j+1) = = m_i+1,j+1) p_i,j := 2;
            if (min(m_i+1,j, m_i+1,j+1, m_i,j+1) = = m_i,j+1) p_i,j := 3;
        }
    }
}
//According to the dynamic programming approach the path
//with the smallest associated total-cost is now obtained
//by traversing the P-matrix in the following manner to obtain
//the decision border in the score space spanned by the
//classes in question.
i := 0;
j := 0;
repeat
{
    b_i,j^c1,c2 := 0;
    for a := i + 1 to N_LUT step 1
    {
        b_a,j^c1,c2 := c_1;
    }
    for a := j + 1 to N_LUT step 1
    {
        b_i,a^c1,c2 := c_2;
    }
    iold := i;
    jold := j;
    if (p_iold,jold < 3) then i := iold + 1;
    if (p_iold,jold > 1) then j := jold + 1;
} until (i = = N_LUT j = = N_LUT);
```

The dynamic programming approach can be extended with regularisation terms, which constraint the shape of the border.

An alternative method for determining the decision border could be to fit a B-spline with two control points in such a way that the associated cost is minimised.

Using the decision borders determined from the strategy outlined above an example can now be classified in the following manner:

Present the example to the network in order to obtain the score values or vote numbers $$S_c(\bar{x}) = \sum_{i \in \Omega} \Theta_k(v_{a_1(\bar{x}),c})$$

Define a new set of score values $d_c$ for all classes and initialise the scores to zero: $d_c=0$, $1 \leq c \leq N_c$.

Loop through all possible inter-class combinations, $(C_1, C_2)$, and update the vote-values:

$$d_{b_{S_{c_1}(\bar{x}),S_{c_2}(\bar{x})}^{c_1,c_2}} := d_{b_{S_{c_1}(\bar{x}),S_{c_2}(\bar{x})}^{c_1,c_2}} + 1$$

The example is now classified as belonging to the class with the label found from $$\underset{c}{\mathrm{argmax}}(d_c).$$

A leave-one-out cross-validation test using the decision borders determined from the strategy outlined above is obtained in the following manner:

Present the example to the network in order to obtain the leave-one-out score values or vote numbers $$\Gamma_c(\bar{x}) = \sum_{i \in \Omega} \Theta_{k+S_{C_T(\bar{x}),c}}(v_{a_1(\bar{x}),c})$$

Define a new set of score values $d_c$ for all classes and initialise the scores to zero: $d_c=0$, $1 \leq c \leq N_c$.

Loop through all possible inter-class combinations, ($c_1$, $c_2$), and update the vote-values:

$$d_{b^{c_1,c_2}_{\Gamma_{c_1}(\bar{x}),\Gamma_{c_2}(\bar{x})}} := d_{b^{c_1,c_2}_{\Gamma_{c_1}(\bar{x}),\Gamma_{c_2}(\bar{x})}} + 1$$

The example is now classified as belonging to the class with the label found from $$\operatorname*{argmax}_{c}(d_c).$$

With reference to FIG. 5 the above adjustment procedure for the decision rules (borders) $\Xi$ may be described as Initialise the system by setting all values of $\bar{\beta}$ to one, selecting a WTA scheme on a two by two basis and by training the n-tuple classifier according to the flow chart in FIG. 4. (5.0)

Batch mode optimisation is chosen. (5.1)

Test all examples by performing a leave-one-out classification as outline above (5.12) and calculate the obtained leave-one-out cross-validation error rate and use it as the $Q_G$-measure. (5.13)

Store the values of $\bar{\beta}$ and the corresponding $Q_G$-value as well as the $\Xi$ rules (the $B^{c_1,c_2}$ matrices). (5.14)

If the $Q_G$-value does not satisfy a given criterion or another stop criterion is met then adjust the $\Xi$-rules according to the dynamic programming approach outline above. (5.16, 5.15)

If the $Q_G$-value is satisfied or another stop criterion is met then select the combination with the lowest total error-rate. (5.17)

In the above case one would as alternative stop criterion use a criterion that only allows two loops through the adjustment scheme.

EXAMPLE 2

This example illustrates an optimisation procedure for adjusting $\bar{\beta}$.

For each class we again define a single output score $$S_c(v_{a_1(x),c}, \bar{\beta}) = \sum_{i \in \Omega} \Theta_{k_c}(v_{a_1(x),c}).$$

With these score values the example is now classified as belonging to the class with the label found from $$\operatorname*{argmax}_{c}(S_c).$$

In this example we use $\bar{\beta}=(k_1,k_2,\ldots,k_{N_c})$. We also initialise the $\Xi$ rules to describe a WTA decision when comparing the output scores from the different classes.

Initialise the system by setting all $k_c$-values to one, selecting a WTA scheme and by training the n-tuple classifier according to the flow chart in FIG. 4. (5.0)

Batch mode optimisation is chosen. (5.1)

Test all examples using a leave-one-out cross-validation test (5.12) and calculate the obtained leave-one-out cross-validation error rate used as $Q_G$. (5.13)

Store the values of $\bar{\beta}$ and the corresponding $Q_G$ value. (5.14)

Loop through all possible combinations of $$k_{C_1}, k_{C_2}, K, k_{C_{N_c}}$$

where $k_j \in \{1,2,3,\ldots k_{MAX}\}$. (5.16, 5.15)

Select the combination with the lowest total error-rate. (5.17)

For practical use, the $k_{MAX}$-value will depend upon the skewness of the class priors and the number of address-lines used in the RAM net system.

EXAMPLE 3

This example also illustrates an optimisation procedure for adjusting $\bar{\beta}$ but with the use of a local quality function $Q_L$.

For each class we now define as many output scores as there are competing classes, i.e. $N_c-1$ output scores:

$$S_{c_j,c_k}(v_{a_1(x),c_j}, \bar{\beta}) = \sum_{i \in \Omega} \Theta_{k_{c_j,c_k}}(v_{a_i(x),c_j}), \forall k \ne j.$$

With these score values a decision is made in the following manner

Define a new set of score values $d_c$ for all classes and initialise the scores to zero: $d_c=0$, $1 \le c \le N_c$.

Loop through all possible inter-class combinations, ($c_1$, $c_2$), and update the vote-values:

If $S_{c_1,c_2} > S_{c_2,c_1}$ then $d_{c_1}:=d_{c_1}+1$ else $d_{c_2}:=d_{c_2}+1$.

The example is now classified as belonging to the class with the label found from $$\operatorname*{argmax}_{c}(d_c).$$

In this example we use $$\bar{\beta} = (k_{C_1,C_2}, k_{C_1,C_3}, \ldots, k_{C_1,C_{N_c-1}}, k_{C_2,C_1}, \ldots k_{C_{N_c},C_{N_c-1}}).$$

We also initialise the $\Xi$ rules to describe a WTA decision when comparing the output scores from the different classes.

Initialise the system by setting all $k_{c_1,c_2}$-values to say two, selecting a WTA scheme and by training the n-tuple classifier according to the flow chart in FIG. 4. (5.0)

On line mode as opposed to batch mode optimisation is chosen. (5.1)

For all examples in the training set (5.2, 5.7, and 5.8) do:

Test each example to obtain the winner class $C_W$ in a leave-one-cross-validation. Let the $Q_L$-measure compare $C_W$ with the true class $C_T$. (5.3,5.4)

If $C_W \ne C_T$ a leave-one-out error is made so the values of $k_{C_W,C_T}$ and $k_{C_T,C_W}$ are adjusted by incrementing $k_{C_W,C_T}$ with a small value, say 0.1, and by decrementing $k_{C_T,C_W}$ with a small value, say 0.05. If the adjustment will bring the values below one, no adjustment is performed. (5.5,5.6)

When all examples have been processed the global information measure $Q_G$ (e.g. the leave-one-out-error-rate) is calculated and the values of $\bar{\beta}$ and $Q_G$ are stored. (5.9,5,10)

If $Q_G$ or another stop criterion is not fulfilled the above loop is repeated. (5.11)

If $Q_G$ is satisfied or another stop criterion is fulfilled the best value of the stored $Q_G$-values are chosen together with the corresponding parameter values $\bar{\beta}$ and decision rules $\Xi$. (5.17, 5.18)

The foregoing description of preferred exemplary embodiments of the invention has been presented for the purpose of illustration and description. It is not intended to be exhaustive or to limit the invention to the precise form disclosed, and obviously many modifications and variations are possible in light of the present invention to those skilled in the art. All such modifications which retain the basic underlying principles disclosed and claimed herein are within the scope of this invention.

What is claimed is:

1. A computerized method of training a computer classification system for a network comprising a number of n-tuple or Look Up Tables (LUTs), with each n-tuple or LUT comprising a number of rows corresponding to at least a subset of possible classes and further comprising, a number of columns being addressed by signals or elements of sampled training input data examples, each column being defined by a vector having cells with values, wherein the column vector cell values are determined based on one or more training sets of input data examples for different classes so that at least part of the cells comprise or point to information based on the number of times the corresponding cell address is sampled from one or more sets of training input examples, said method being characterized in that one or more output score functions are determined for evaluation of at least one output score value per class, and one or more decision rules are determined to be used in combination with at least part of the obtained output scores to determine a winning class, wherein said determination of the output score functions and/or decision rules comprises:

determining output score functions based on the information of at least part of the determined column vector cell values, and adjusting at least part of the output score functions based on an information measure evaluation, and/or determining decision rules based on the information of at least part of the determined column vector cell values, and adjusting at least part of the decision rules based on an information measure evaluation; and training the computer classification system.

2. A method according to claim 1, wherein the output score functions are determined based on a validation set of input data examples.

3. A method according to claim 2, wherein the decision rules are determined based on a validation set of input data examples.

4. A method according to claim 3, wherein the adjustment process comprises the steps of a) selecting an input example from the validation set(s),
b) determining a local quality value corresponding to the sampled validation input example, the local quality value being a function of at least part of the addressed column cell values,
c) determining if the local quality value fulfils a required local quality criterion, if not,
adjusting one or more of the output score functions and the decision rules if the local quality criterion is not fulfilled,
d) selecting a new input example from a predetermined number of examples of the validation set(s),
e) repeating the local quality test steps b)–d) for all the predetermined validation input examples,
f) determining a global quality value based on at least part of the column vectors being addressed during the local quality test,
g) determining if the global quality value fulfils a required global quality criterion, and
h) repeating steps a)–g) until the global quality criterion is fulfilled.

5. A method according to claim 4, wherein steps b)–d) are carried out for all examples of the validation set(s).

6. A method according to claim 4, wherein the local and/or global quality value is defined as functions of at least part of the column cells.

7. A method according to claim 4, wherein the adjustment iteration process is stopped if the quality criterion is not fulfilled after a given number of iterations.

8. A method according to claim 2, wherein determination of the output score functions is based on an information measure evaluating the performance on the validation example set.

9. A method according to claim 8, wherein the validation example set equals at least part of the training set and the information measure is based on a leave-one-out cross validation evaluation.

10. A method according to claim 2, wherein the validation set comprises at least part of the training set(s) of input data examples.

11. A method according to claim 2, wherein the adjustment process comprises the steps of a) selecting an input example from the validation set(s),
b) determining a local quality value corresponding to the sampled validation input example, the local quality value being a function of at least part of the addressed column cell values,
c) determining if the local quality value fulfils required local quality criterion, if not,
adjusting one or more of the output score functions if the local quality criterion is not fulfilled,
d) selecting a new input example from a predetermined number of examples of the validation set(s),
e) repeating the local quality test steps b)–d) for all the predetermined validation input examples,
f) determining a global quality value based on at least part of the column vectors being addressed during the local quality test,
g) determining if the global quality value fulfils a required global quality criterion, and
h) repeating steps a)–g) until the global quality criterion is fulfilled.

12. A method according to claim 11, wherein the adjustment iteration process is stopped if the quality criterion is not fulfilled after a given number of iterations.

13. A method according to claim 11, wherein the local and/or global quality value is defined as functions of at least part of the column cells.

14. A method according to claim 11, wherein steps b)–d) are carried out for all examples of the validation set(s).

15. A method according to claim 1, wherein the decision rules are determined based on a validation set of input data examples.

16. A method according to claim 15, wherein determination of the decision rules is based on an information measure evaluating the performance on the validation example set.

17. A method according to claim 16, wherein the validation example set equals at least part of the training set and the information measure is based on a leave-one-out cross validation evaluation.

18. A method according to claim 15, wherein the validation set comprises at least part of the training set(s) of input data examples.

19. A method according to claim 15, wherein the adjustment process comprises the steps of
   a) selecting an input example from the validation set(s),
   b) determining a local quality value corresponding to the sampled validation input example, the local quality value being a function of at least part of the addressed column cell values,
   c) determining if the local quality value fulfils required local quality criterion, if not,
   adjusting one or more of the decision rules if the local quality criterion is not fulfilled,
   d) selecting a new input example from a predetermined number of examples of the validation set(s),
   e) repeating the local quality test steps b)–d) for all the predetermined validation input examples,
   f) determining a global quality value based on at least part of the column vectors being addressed during the local quality test,
   g) determining if the global quality value fulfils a required global quality criterion, and
   h) repeating steps a)–g) until the global quality criterion is fulfilled.

20. A method according to claim 19, wherein steps b)–d) are carried out for all examples of the validation set(s).

21. A method according to claim 19, wherein the local and/or global quality value is defined as functions of at least part of the column cells.

22. A method according to claim 19, wherein the adjustment iteration process is stopped if the quality criterion is not fulfilled after a given number of iterations.

23. A method according to claim 1, wherein the output score functions are determined by a set of parameter values.

24. A method according to claim 1, wherein determination of the output score functions comprises initializing the output score functions.

25. A method according to claim 24, wherein the initialization of the output score functions comprises determining a number of set-up parameters.

26. A method according to claim 25, wherein the adjustment comprises changing the values of the set-up parameters.

27. A method according to claim 24, wherein the initialization of the output score functions comprises setting all output score functions to a predetermined mapping function.

28. A method according to claim 1, wherein determination of the decision rules comprises initializing the decision rules.

29. A method according to claim 28, wherein the initialization of the decision rules comprises setting the rules to a predetermined decision scheme.

30. A method according to claim 1, wherein the determination of the column vector cell values comprises the training steps of
   a) applying a training input data example of a known class to the classification network, thereby addressing one or more column vectors,
   b) incrementing, preferably by one, the value or vote of the cells of the addressed column vector(s) corresponding to the row(s) of the known class, and
   c) repeating steps a)–b) until all training examples have been applied to the network.

31. A method according to claim 1, wherein the adjustment process comprises the steps of
   determining a global quality value based on at least part of the column vector cell values,
   determining if the global quality value fulfils a required quality criterion, and
   adjusting at least part of the output score functions until the global quality criterion is fulfilled.

32. A method according to claim 31, wherein the global quality value is defined as functions of at least part of the column cells.

33. A method according to claim 31, wherein the adjustment iteration process is stopped if the quality criterion is not fulfilled after a given number of iterations.

34. A method according to claim 1, wherein the adjustment process comprises the steps of
   determining a global quality value based on at least part of the column vector cell values,
   determining if the global quality value fulfils a required quality criterion, and
   adjusting at least part of the decision rules until the global quality criterion is fulfilled.

35. A method according to claim 34, wherein the global quality value is defined as functions of at least part of the column cells.

36. A method according to claim 34, wherein the adjustment iteration process is stopped if the quality criterion is not fulfilled after a given number of iterations.

37. A method according to claim 1, wherein the adjustment process comprises the steps of
   determining a global quality value based on at least part of the column vector cell values,
   determining if the global quality value fulfils a required quality criterion, and
   adjusting at least part of the output score functions and part of the decision rules until the global quality criterion is fulfilled.

38. A method according to claim 37, wherein the global quality value is defined as functions of at least part of the column cells.

39. A method according to claim 37, wherein the adjustment iteration process is stopped if the quality criterion is not fulfilled after a given number of iterations.

40. A method of classifying input data examples into at least one of a plurality of classes using a computer classification method according to claim 1, whereby column cell values for each n-tuple or LUT and output score functions and/or decision rules are determined using one or more training or validation sets of input data examples, said method comprising
   a) applying an input data example to be classified to the configured classification network thereby addressing column vectors in the set of n-tuples or LUTs,
   b) selecting a set of classes which are to be compared using a given set of output score functions and decision rules thereby addressing specific rows in the set of n-tuples or LUTs, c) determining output score values as a function of the column vector cells and using the determined output score functions, d) comparing the calculated output values using the determined decision rules, and e) selecting the class or classes that win(s) according to the decision rules.

41. A system for training a computer classification system which can be defined by a network comprising a stored number of n-tuples or Look Up Tables (LUTs), with each n-tuple or LUT comprising a number of rows corresponding to at least a subset of possible classes and further comprising a number of columns being addressed by signals or elements of sampled training input data examples, each column being defined by a vector having cells with values, said system comprising a) input means for receiving training input data examples of known classes, b) means for sampling the received input data examples and addressing column vectors in the stored set of n-tuples or LUTs, c) means for addressing specific rows in the set of n-tuples or LUTs, said rows corresponding to a known class, d) storage means for storing determined n-tuples or LUTs, e) means for determining column vector cell values so as to comprise or point to information based on the number of times the corresponding cell address is sampled from the training set(s) of input examples, characterized in that said system further comprises f) means for determining one or more output score functions and one or more decision rules, wherein said output score functions and decision rules determining means is adapted for determining said output score functions based on the information of at least part of the determined column vector cell values and a validation set of input data examples of known classes, determining said decision rules based on the information of at least part of the determined column vector cell values and a validation set of input data examples of known classes, and wherein the means for determining the output score functions and/or decision rules comprises means for initializing one or more sets of output score functions and/or decision rules, and means for adjusting output score functions and decision rules by use of at least part of the validation set of input examples.

42. A system according to claim 41, wherein the means for determining the output score functions is adapted to determine such functions from a family of output score functions determined by a set of parameter values.

43. A system according to claim 41, wherein said validation set comprises at least part of the training set(s) used for determining the column cell values.

44. A system according to claim 41, wherein the means for determining the column vector cell values is adapted to determine these values as a function of the number of times the corresponding cell address is sampled from the set(s) of training input examples.

45. A system according to claim 41, wherein, when a training input data example belonging to a known class is applied to the classification network thereby addressing one or more column vectors, the means for determining the column vector cell values is adapted to increment the value or vote of the cells of the addressed column vector(s) corresponding to the row(s) of the known class, said value preferably being incremented by one.

46. A system according to claim 41, wherein the means for adjusting output score functions is adapted to determine a global quality value based on at least part of column vector cell values, determine if the global quality value fulfils a required global quality criterion, and adjust at least part of the output score functions until the global quality criterion is fulfilled.

47. A system according to claim 46, wherein the means for adjusting the output score functions and decision rules is further adapted to stop the iteration process if the global quality criterion is not fulfilled after a given number of iterations.

48. A system according to claim 41, wherein the means for adjusting output score functions and decision rules is adapted to a) determine a local quality value corresponding to a sampled validation input example, the local quality value being a function of at least part of the addressed vector cell values, b) determine if the local quality value fulfils a required local quality criterion, c) adjust one or more of the output score functions if the local quality criterion is not fulfilled, d) repeat the local quality test for a predetermined number of training input examples, e) determine a global quality value based on at least part of the column vectors being addressed during the local quality test, f) determine if the global quality value fulfils a required global quality criterion, and g) repeat the local and the global quality test until the global quality criterion is fulfilled.

49. A system according to claim 48, wherein the means for adjusting the output score functions and decision rules is further adapted to stop the iteration process if the global quality criterion is not fulfilled after a given number of iterations.

50. A system according to claim 41, wherein the means for adjusting decision rules is adapted to determine a global quality value based on at least part of column vector cell values, determine if the global quality value fulfils a required global quality criterion, and adjust at least part of the decision rules until the global quality criterion is fulfilled.

51. A system according to claim 50, wherein the means for adjusting the output score functions and decision rules is further adapted to stop the iteration process if the global quality criterion is not fulfilled after a given number of iterations.

52. A system according to claim 41, wherein the means for adjusting output score functions and decision rules is adapted to a) determine a local quality value corresponding to a sampled validation input example, the local quality value being a function of at least part of the addressed vector cell values, b) determine if the local quality value fulfils a required local quality criterion, c) adjust one or more of the decision rules if the local quality criterion is not fulfilled, d) repeat the local quality test for a predetermined number of training input examples, e) determine a global quality value based on at least part of the column vectors being addressed during the local quality test, f) determine if the global quality value fulfils a required global quality criterion, and g) repeat the local and the global quality test until the global quality criterion is fulfilled.

53. A system according to claim 52, wherein the means for adjusting the output score functions and decision rules is further adapted to stop the iteration process if the global quality criterion is not fulfilled after a given number of iterations.

54. A system according to claim 41, wherein the means for adjusting decision rules is adapted to determine a global quality value based on at least part of column vector cell values, determine if the global quality value fulfils a required global quality criterion, and adjust at least part of the output score functions and decision rules until the global quality criterion is fulfilled.

55. A system according to claim 54, wherein the means for adjusting the output score functions and decision rules is further adapted to stop the iteration process if the global quality criterion is not fulfilled after a given number of iterations.

56. A system according to claim 41, wherein the means for adjusting output score functions and decision rules is adapted to a) determine a local quality value corresponding to a sampled validation input example, the local quality value being a function of at least part of the addressed vector cell values, b) determine if the local quality value fulfils a required local quality criterion, c) adjust one or more of the output score functions and decision rules if the local quality criterion is not fulfilled, d) repeat the local quality test for a predetermined number of training input examples, e) determine a global quality value based on at least part of the column vectors being addressed during the local quality test, f) determine if the global quality value fulfils a required global quality criterion, and g) repeat the local and the global quality test until the global quality criterion is fulfilled.

57. A system according to claim 56, wherein the means for adjusting the output score functions and decision rules is further adapted to stop the iteration process if the global quality criterion is not fulfilled after a given number of iterations.

58. A system according to claim 41, wherein the means for storing n-tuples or LUTs comprises means for storing adjusted output score functions and decision rules and separate means for storing best so far output score functions and decision rules or best so far classification system configuration values.

59. A system according to claim 58, wherein the means for adjusting the output score functions and decision rules is further adapted to replace previously separately stored best so far output score functions and decision rules with obtained adjusted output score functions and decision rules if the determined global quality value is closer to fulfill the global quality criterion then the global quality value corresponding to previously separately stored best so far output score functions and decision rules.

60. A system for classifying input data examples of unknown classes into at least one of a plurality of classes, said system comprising:

storage means for storing a number or set of n-tuples or Look Up Tables (LUTs) with each n-tuple or LUT comprising a number of rows corresponding to at least a subset of the number of possible classes and further comprising a number of column vectors, each column vector being addressed by signals or elements of a sampled input data example, and each column vector having cell values being determined during a training process based on one or more sets of training input data examples, storage means for storing one or more output score functions and/or one or more decision rules, each output score function and/or decision rule being determined during a training or validation process based on one or more sets of validation input data examples, said system further comprising:

input means for receiving an input data example to be classified, means for sampling the received input data example and addressing column vectors in the stored set of n-tuples or LUTs, means for addressing specific rows in the set of n-tuples or LUTs, said rows corresponding to a specific class, means for determining output score values using the stored output score functions and at least part of the stored column vector values, and means for determining a winning class or classes based on the output score values and stored decision rules.

* * * * *